(12) United States Patent
Krobot et al.

(10) Patent No.: US 8,668,038 B2
(45) Date of Patent: Mar. 11, 2014

(54) HYDRAULIC CAB TILT ACTUATOR WITH LOST MOTION

(75) Inventors: Borivoj Krobot, La Porte, IN (US); Leonard D. Yoder, Elkhart, IN (US)

(73) Assignee: Actuant Corporation, Menomonee Falls, WI (US)

( * ) Notice: Subject to any disclaimer, the term of this patent is extended or adjusted under 35 U.S.C. 154(b) by 2 days.

(21) Appl. No.: 13/444,156

(22) Filed: Apr. 11, 2012

(65) Prior Publication Data

US 2012/0267181 A1 Oct. 25, 2012

Related U.S. Application Data

(60) Provisional application No. 61/477,676, filed on Apr. 21, 2011.

(51) Int. Cl.
*F15B 15/02* (2006.01)
*B62D 33/07* (2006.01)

(52) U.S. Cl.
USPC .............. 180/89.15; 296/190.05; 92/181 P; 92/15; 92/DIG. 4

(58) Field of Classification Search
USPC ................. 180/89.14, 89.15, 89.18; 296/190.04–190.07; 188/276, 322.22, 188/300; 267/64.15; 92/181 P, 15, 23.85 B, 92/134, 109–155, DIG. 4
See application file for complete search history.

(56) References Cited

U.S. PATENT DOCUMENTS

| | | | | |
|---|---|---|---|---|
| 2,348,160 A * | 5/1944 | Thornhill | .................... | 267/64.15 |
| 3,647,239 A * | 3/1972 | Katsumori | ............. | 280/124.154 |
| 3,831,999 A | 8/1974 | Sonneborn | | |
| 3,948,341 A | 4/1976 | Foster | | |
| 4,105,087 A | 8/1978 | Levington | | |
| 4,258,609 A * | 3/1981 | Conway | .......................... | 91/416 |
| 4,381,857 A * | 5/1983 | Cook | ......................... | 267/64.15 |
| 4,446,939 A | 5/1984 | Oudelaar | | |
| 4,513,845 A | 4/1985 | Stephens et al. | | |
| 5,190,126 A * | 3/1993 | Curnutt | ........................ | 188/269 |
| 6,948,580 B2 | 9/2005 | Scholten et al. | | |
| 7,055,637 B2 | 6/2006 | Mallan et al. | | |
| 7,426,983 B2 * | 9/2008 | Ducos et al. | .................. | 188/297 |
| 2010/0060034 A1 * | 3/2010 | Togama et al. | .......... | 296/190.06 |

* cited by examiner

*Primary Examiner* — Ruth Ilan
(74) *Attorney, Agent, or Firm* — Quarles & Brady LLP

(57) ABSTRACT

A lost motion piston assembly comprising a lost motion cavity formed within a piston and a lost motion piston disposed within the lost motion cavity. The lost motion piston forms a sealed gas cavity. The sealed gas cavity contracts when the actuator is extended under pressure into the cylinder space and expands under pressure when the actuator is retracted by relieving pressure in the cylinder space.

12 Claims, 3 Drawing Sheets

HYDRAULIC CAB TILT ACTUATOR WITH LOST MOTION

CROSS-REFERENCE TO RELATED APPLICATIONS

This claims the benefit of U.S. Provisional Patent Application No. 61/477,676 filed Apr. 21, 2011, which is hereby incorporated by reference in its entirety for all purposes.

STATEMENT CONCERNING FEDERALLY SPONSORED RESEARCH OR DEVELOPMENT

Not applicable.

FIELD OF THE INVENTION

The present invention relates to hydraulic actuators and, more particularly, to hydraulic actuators with lost motion capability and, most particularly, to a lost motion piston assembly for use in cab tilt applications.

BACKGROUND OF THE INVENTION

Vehicles in which the cab tilts up to provide access to the vehicle's engine are generally referred to as "tilt-cab" vehicles. The cab, the enclosed space where the driver is seated, in a tilt-cab vehicle is typically positioned over the engine and front axle. As a result of this stacked design, tilt-cab vehicles are generally shorter than an equivalent conventional cab vehicle, where the cab is positioned behind the engine and front axle.

The cab in a tilt-cab design generally has two positions. In the driving position, the cab body is engaged and resiliently supported on the vehicle chassis and orientated such that the vehicle can be driven. In the maintenance position, the cab is tilted upward at a pivot point near the front of the cab to provide access to the engine and other mechanisms.

For tilting a resiliently mounted cab, it is known to use a hydraulic tilting device disposed between the chassis and the tilting cab to raise and lower the cab between the driving and maintenance positions. In order to ensure that the tilting device does not interfere with the spring movements of the cab relative to the chassis while the vehicle is being driven, tilting devices with a so-called lost motion capability are used. These tilting devices can be divided largely into mechanical types and hydraulic types. Mechanical types have, for example, a lost-motion arm, which is usually pivotably connected between the tilting cylinder and the cab, or a sort of pin-and-groove connection between the tilting cylinder and the cab. The lost motion capability is provided by the mechanical play in the pin-and-groove connection.

Hydraulic types have, for example, a dual acting hydraulic actuator to provide the lost motion effect. Dual acting hydraulic actuators contain two internal hydraulic cavities. Supplying hydraulic fluid to the push cavity will cause the actuator to extend in length, thereby exerting force to tilt the cab upward. Supplying hydraulic fluid to the pull cavity will cause the actuator to contract in length, thereby exerting force to lower the cab downward. To provide lost motion capability, it is known to place the push cavity in fluid communication with the pull cavity. As the resiliently mounted cab bounces on the chassis and pushing and pulling forces are exerted on the actuator, the motion of the hydraulic fluid between the push and pull cavities allows the actuator to extend and contract with relative ease, providing lost motion.

While a dual acting hydraulic actuator offers a means of providing lost motion in a tilt-cab design, a dual acting hydraulic actuator is not always necessary to fulfill the cab tilt functionality. A single acting actuator is sufficient to provide a means for cab tilt because gravity is sufficient to provide the downward force to lower the cab. In addition, dual acting actuators are generally more complex than single acting actuators. As a result, dual acting actuators are more costly and are less reliable than single acting actuators. Accordingly, it would be an advance in the state of the art to provide an alternative means of providing a hydraulic actuator with lost motion capabilities suitable for use in a tilt-cab design.

SUMMARY OF THE INVENTION

A hydraulic tilting device is presented. The hydraulic tilting device is used for tilting the cab of a vehicle, which is resiliently supported on the chassis of the vehicle, between a driving position and a tilted position. The hydraulic tilting device comprises an actuator. The actuator has a cylinder housing. The cylinder housing has a cylinder space. The actuator further has a piston rod. A first portion of the piston rod is disposed within the cylinder space and a second portion of the piston rod extends out from the cylinder space. A gas pressure cavity is provided in the cylinder space. The gas pressure cavity contracts when the actuator is extended under pressure into the cylinder space and expands when the actuator is retracted by relieving pressure in the cylinder space so as to provide for oscillating extensions and retractions of the piston rod relative to the cylinder housing in the driving position so as not to interfere with the operation of the suspension as the cab bounces up and down relative to the chassis when driving the vehicle.

A lost motion piston assembly is also presented. The lost motion piston assembly is used in an actuator for tilting the cab of a vehicle, which is resiliently support on the chassis of the vehicle, between a driving position and a tilted position. The lost motion piston assembly comprises a lost motion cavity formed within a piston and a lost motion piston disposed within the lost motion cavity. The lost motion piston forms a sealed gas cavity. The sealed gas cavity contracts when the actuator is extended under pressure into the cylinder space and expands under pressure when the actuator is retracted by relieving pressure in the cylinder space.

BRIEF DESCRIPTION OF THE DRAWINGS

The invention will be more fully understood by referring to the following Detailed Description of Specific Embodiments in conjunction with the Drawings, of which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
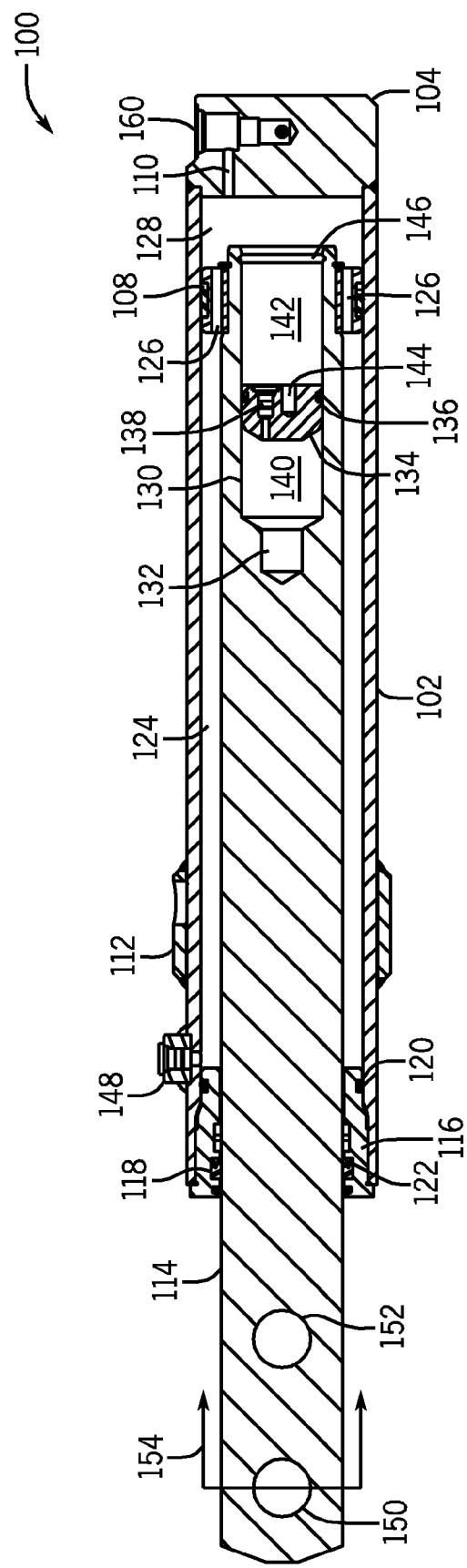
FIG. 1 is a cross-sectional view of an embodiment of Applicant's actuator in a depressurized and retracted position while being axially compressed by an external force.

Referring to FIG. 1, a cross-sectional view of one embodiment of Applicant's single acting actuator 100 is shown, wherein the actuator 100 is in a depressurized and retracted position while being compressed by an external force. A cylinder housing 102 is sealed at one end by a cap 104, forming an interior cavity. In one embodiment, the cap 104 is integrated with the cylinder housing 102. In another embodiment, the cap 104 is attached to the cylinder housing 102 by a threaded connector. In yet another embodiment, the cap 104 is welded to the cylinder housing 102. In one embodiment, the combined length of the cylinder housing and the cap is about 20.4 inches and the outer diameter of the cylinder housing is about 3.5 inches.

The cap 104 includes a pressure port 160 and a pressure channel 110. The pressure channel 110 connects the pressure port 160 to the interior of the cylinder housing 102. In an embodiment, the pressure port 160 includes a standard threaded connector for connecting a source of hydraulic fluid under pressure.

In an embodiment, a mounting bracket 112 is attached to the cylinder housing 102. The actuator 100 is attached to the chassis of a tilt-cab vehicle via the mounting bracket 112. The mounting bracket 112 may includes pegs (not shown in this view) to facilitate attachment to the vehicle chassis.

A piston rod 114 is partially disposed within the interior cavity of the cylinder housing 102. One end of the piston rod 114 extends from the rod end of the interior cavity and the other end of piston rod 114 is disposed in the bore end of the interior cavity. The exposed portion of the piston rod 114 may include mounting holes 150 and 152. In an embodiment, mounting hole 150 may be used for mounting the rod to the cab of a tilt-cab vehicle and mounting hole 152 may be used for mounting a safety device, such as a locking bar, to the rod.

A collar 116, or sealing gland, is attached to the cylinder housing 102. The collar 116 may be is threadedly attached to cylinder housing 102. To create a hydraulic seal, the interface between collar 116 and cylinder housing 102 may be sealed by a seal 120. The collar 116 secures the piston rod 114 in a fixed concentric position in the mouth of cylinder housing 102. The collar 116 contains a channel 118 in contact with the piston rod 114. A seal 122 is disposed within the channel 118. The O-ring 122 creates a hydraulic seal between the piston rod 114 and the collar 116, thereby forming a pressure cavity 124. In an embodiment, the piston rod 114 is about 24 inches long and about 2.2 inches in diameter.

In one embodiment, a spacer 108 is attached to and circumscribes the end of piston rod 114. Spacer 108 holds the end of piston rod 114 in a fixed concentric position within the cylinder housing 102. Channels 126 are formed through the spacer 108, since the actuator 100 is a single acting actuator. The channels 126 connect the pressure cavity 124 on the sides of the piston rod 114 with pressure cavity 128 at the end of the piston rod 114 near the cap 104. As such, the actuator 100 has a single internal hydraulic chamber, and can therefore be classified as a "single acting" actuator. It is noted that the invention could be used with a double acting actuator, if so desired.

The piston rod 114 is configured to move axially in a reciprocating manner relative to the cylinder housing 102. During such motion, the seal 122 slides along the length of piston rod 114 while maintaining the hydraulic seal between piston rod 114 and collar 116. In addition, spacer 108 is configured to slide axially with piston rod 114 along the interior surface of the cylinder housing 102 while retaining the concentric position of the piston rod 114 within the cylinder housing 102.

A lost motion bore is formed in the end of piston rod 114 that is enclosed within the cylinder housing 102. In an embodiment, the lost motion bore is comprised of an outer chamber 130 and an inner chamber 132. Outer chamber 130 has a diameter larger than inner chamber 132. The end of chamber 130 may taper to join chamber 132. Alternately, chamber 130 may abruptly transition to chamber 132 at a right angle. In an embodiment, the outer chamber is about 5 inches long and about 1.5 inches in diameter. In an embodiment, the inner chamber is about 1.3 inches long and about 0.8 inches in diameter.

A lost motion piston 134 is disposed within the outer chamber 130. The lost motion piston 134 is configured to move axially in a reciprocating manner relative to the chamber 130. A seal 136 circumscribes the lost motion piston 134. The seal 136 creates a pressure seal that divides the lost motion bore into an isolated gas cavity 140 and a fluid cavity 142. The isolated gas cavity 140 is formed by the inner chamber 132 and a portion of the outer chamber 130 to the left of the lost motion piston 134. The fluid cavity 142 is formed by the remainder of the outer chamber 130 to the right of the lost motion piston 134. In an embodiment, the lost motion piston 134 is about 1.3 inches wide.

In the illustrated embodiment, a channel 138 is formed in the lost motion piston 134. Gas may be released through the channel 138 during insertion of the lost motion piston 134 to maintain atmospheric pressure in the isolated gas cavity 140. Channel 138 may include a port capable of accepting a connector for the purpose of adjusting the amount of gas in the isolated gas cavity 140. In one embodiment, when the connector is removed, the port may seal to create a hydraulic seal between the isolated gas cavity 140 and the fluid cavity 142. In another embodiment, a plug is inserted into the port to create a hydraulic seal between the isolated gas cavity 140 and the fluid cavity 142. A threaded hole 144 may be used to connect the lost motion piston 134 with an installation bolt or fixture used to position the piston to desired depth within the outer chamber 130. In an embodiment, the lost motion piston 134 is positioned at a depth where the mouth of the fluid chamber 142 and the closest edge of the lost motion piston 134 is about 1.3 inches. In this position, the gas within the isolated gas cavity 140 is at atmospheric pressure. When the pressure chamber is initially filled with hydraulic fluid, the distance between the mouth of the fluid chamber 142 and the closest edge of the lost motion piston 134 is about 1.9 inches, which positions the center of the lost motion piston 134 about midway along the length of the outer chamber 130. In this position, the gas within the isolated gas cavity 140 is at slightly greater than atmospheric pressure.

The cylinder housing 102 may also include a safety solenoid valve 148. The safety solenoid value 148 opens when the pressure in the pressure cavity exceeds a predetermined limit, thereby venting the contents of the pressure cavity to the atmosphere.

A retaining ring 146 is disposed at the mouth of outer chamber 130. The retaining ring 146 serves as a physical stop to retain the lost motion piston within the outer chamber 130. The retaining ring 146 is a split ring and is open in the center to allow hydraulic fluid to freely flow between the fluid cavity 142 and the pressure cavity 128.

When the tilt-cab vehicle is in the driving position, actuator 100 provides lost motion capabilities. Under normal operating conditions, the resiliently-mounted cab moves up and down relative to the vehicle chassis as the chassis is exposed to mechanical shocks. The cab tilt actuator is connected between the cab and the chassis. Without some play, or lost motion, in this connection mechanical shocks exposed to the chassis would be transmitted to the cab, resulting in a rougher ride for the driver. The lost motion feature allows the cab tilt actuator to extend and retract axially over a set distance so as not to interfere with the resilient connection of the suspension between the cab and chassis, so the cab can oscillate up and down relative to the chassis in normal driving conditions.

While in the driving position and with no external force acting axially on the piston rod 114, the lost motion piston 134 will be approximately centered along the length of the outer chamber 130. As an external force is applied axially to push the piston rod 114 into the cylinder body 102, pressure is exerted on the hydraulic fluid within pressure cavity 124 and pressure cavity 128. This, in turn, exerts pressure on lost motion piston 134, which forces the lost motion piston 134 deeper into the lost motion bore and compresses the gas within the isolated gas cavity 140.

As the external force on the rod increases and the rod is pushed further into the cylinder housing 102, the lost motion piston 134 will further compress the gas in the isolated gas cavity 140 and the pressure within the isolated gas cavity 140 will continue to increase. As a result, the resistance against further movement increases due to the increasing pressure in the isolated gas chamber 140.

In similar fashion, as an external force is applied axially to force the piston rod 114 out of the cylinder body 102, the pressure exerted on the hydraulic fluid is decreased. This, in turn, allows the gas in the isolated gas cavity 140 to expand, which forces the lost motion piston 134 toward the mouth of outer chamber 130.

As the external force on the rod increases and the rod is pulled further out of the cylinder housing 102, the lost motion piston 134 will exert less pressure on the gas in the isolated gas cavity 140 and the pressure within the isolated gas cavity 140 will continue to decrease. As a result, the resistance against further movement increases due to the decreasing pressure in the isolated gas chamber 140.

As the piston rod 114 moves in and out of the cylinder housing 102, hydraulic fluid is able to flow between pressure cavity 124 and pressure cavity 128 through channels 126 in spacer 108. The displacement of hydraulic fluid through channels 126 causes the expansion of the gas in isolated gas cavity 140 (when piston rod 114 is pulled) and compression of the gas in isolated gas cavity 140 (when piston rod 114 is pushed), resulting in lost motion action.

Turning again to FIG. 1, actuator 100 is shown in lost motion mode under an external force 154 acting axially on the piston rod 114 and causing the actuator 100 to shorten in overall length. The force 154 on piston rod 114 displaces the fluid in pressure cavities 124 and 128, which forces the lost motion piston 134 from its neutral position at the approximate center of the outer chamber 130, away from the mouth of the outer chamber 130. As a result, the gas within isolated gas cavity 140 is compressed. The compressed gas provides slightly increased resistance to force 154.

Figure 2:
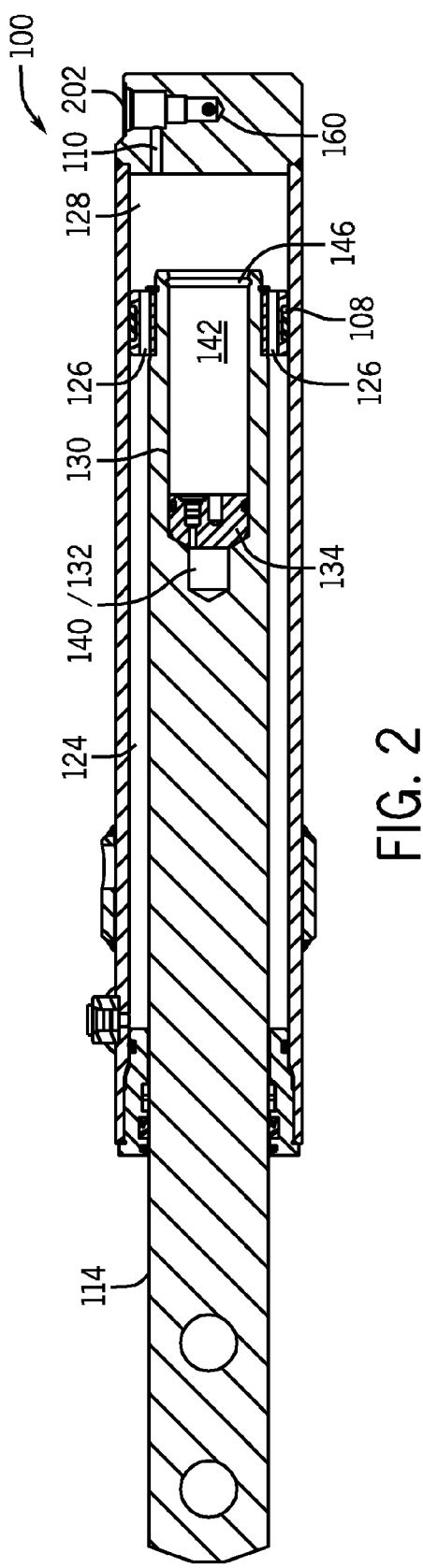
FIG. 2 is a cross-sectional view of the embodiment of FIG. 1, in an intermediate, partially extended position, and pressurized to lift, or tilt, a cab.

Turning to FIG. 2, actuator 100 of FIG. 1 is shown when pressurized and lifting a cab or, if fully extended, in the maintenance position. A source of hydraulic fluid 202 connected to pressure port 160 supplies hydraulic fluid under pressure to pressure cavity 128 through pressure channel 110. The pressure is propagated into pressure cavity 124 through channels 126 in spacer 108. As the pressure increases in the pressure cavities 124 and 128, pressure on the lost motion piston 134 overcomes the pressure of the gas in the isolated gas cavity 140. As a result, the lost motion piston 134 bottoms out against the back of outer cavity 130, compressing the entire quantity of gas in the isolated gas cavity 140 into the volume of the inner chamber 132. In a typical application, the maximum operating pressure within the pressure cavity 124 and 128 is approximately 3,500 psi. In the embodiment illustrated, the pressure within the isolated gas cavity when the lost motion piston 134 is bottomed out against the back of outer cavity 130 is more on the order of about 200 psi.

Once the lost motion piston 134 bottoms out, the lost motion action is overcome and any additional increase in pressure in the pressure cavity 124 and 128 will directly result in piston rod 114 extending out of the cylinder housing 102. The extending piston rod 114 is used to tilt the cab up and to the maintenance position. In a typical application, the piston rod 114 can extend up to about 18 inches from the mouth of the cylinder housing 102.

To lower the cab, the pressure within the pressure cavities 124 and 128 is slowly decreased. In an embodiment, the decrease in pressure is accomplished by exposing the hydraulic fluid to atmospheric pressure through a restricted orifice. The orifice forces the pressure within the pressure cavities 124 and 128 to decrease at a slow, controlled rate. The cab will lower under the influence of gravity at a rate determined by the release of hydraulic fluid from the pressure cavities 124 and 128. Once the pressure in the pressure cavities 124 and 128 drops below the maximum pressure in the isolated gas cavity 140, the gas will expand and the lost motion piston will move back toward the neutral position (midway along the length of the outer chamber 130). The actuator 100 will operate in lost motion mode when the lost motion piston is between, but not in contact with either of, the retainer ring 146 and the inner chamber 132.

Figure 3:
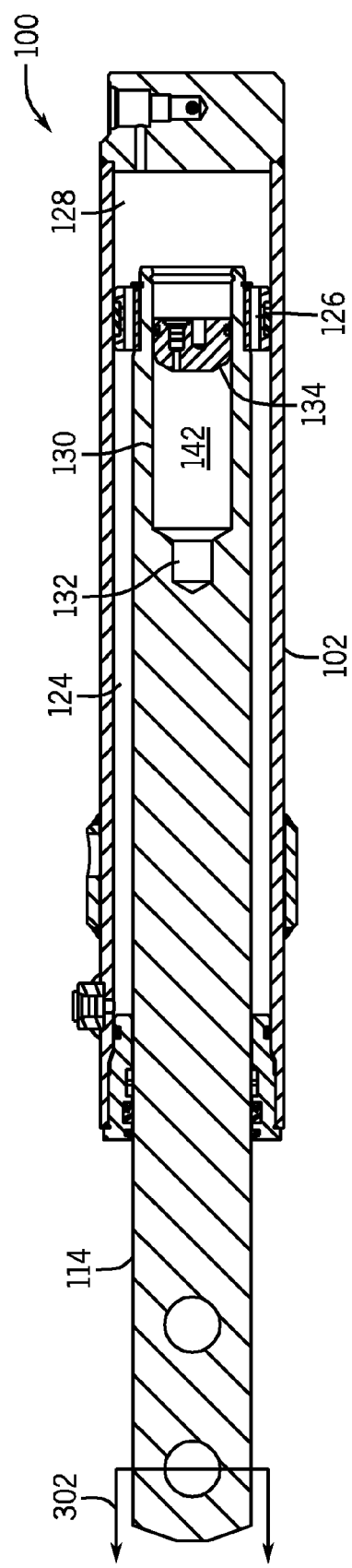
FIG. 3 is a cross-sectional view of the embodiment of FIG. 1 in a depressurized and retracted position while being partially axially extended by an external force.

Turning to FIG. 3, actuator 100 of FIG. 1 is shown. The actuator 100 is in a depressurized and mostly retracted position while being extended by an external force. As the piston rod 114 is extracted out of the cylinder housing 102, the displacement of hydraulic fluid through channels 126 causes the pressure in the pressure cavities 124 and 128 to decrease. As a result, the gas in the isolated gas cavity 140 expands, which moves the lost motion piston 134 toward the mouth of outer cavity 130.

Figure 4:
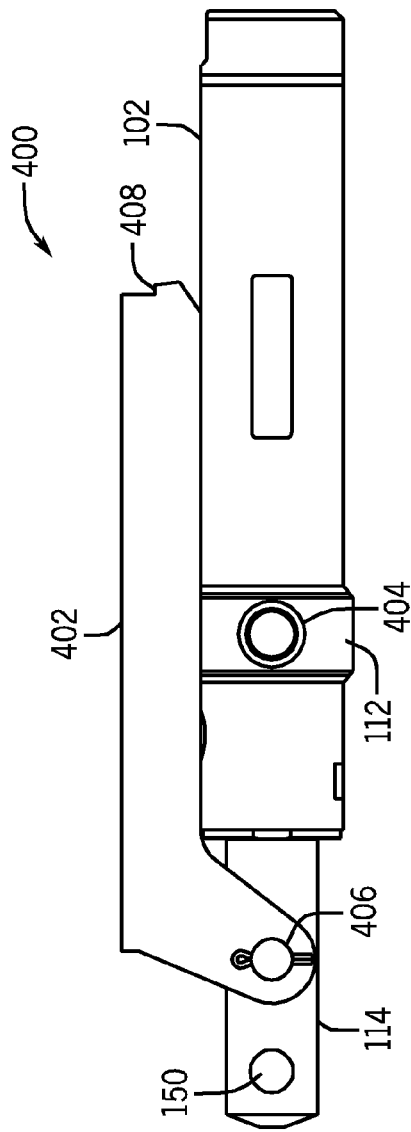
FIG. 4 is an illustration of an embodiment of Applicant's actuator in a depressurized and retracted position and with a locking mechanism to lock the cab in the maintenance position.

Turning to FIG. 4, an embodiment of Applicant's actuator in a depressurized and retracted position (i.e., driving position) and with a locking mechanism to maintain the cab in the maintenance (i.e., lifted or tilted) position. A mounting bracket 112 is attached to the cylinder housing 102. Pegs 404 extend from each side of the mounting bracket 112 (in and out of the page in the view of FIG. 4). The pegs 404 may be used to mount the actuator 400 to the chassis of a vehicle so as to pivot as the actuator extends and retracts.

A piston rod 114 extends from the cylinder housing 102. A mounting hole 150 is formed near the end of piston rod 114. A locking bar 402 is mounted on piston rod 114 by pin 406. The locking bar 402 allows the actuator to support weight in the extended position without being pressurized.

The pin 406 permits the locking bar to pivot about pin 406. The locking bar 402 extends down the length of the cylinder body 102. A notch 408 is formed at the end of locking bar 402. The notch 408 allows the locking bar 402 to brace against the cylinder body 102 when the locking bar is engaged.

Figure 5:
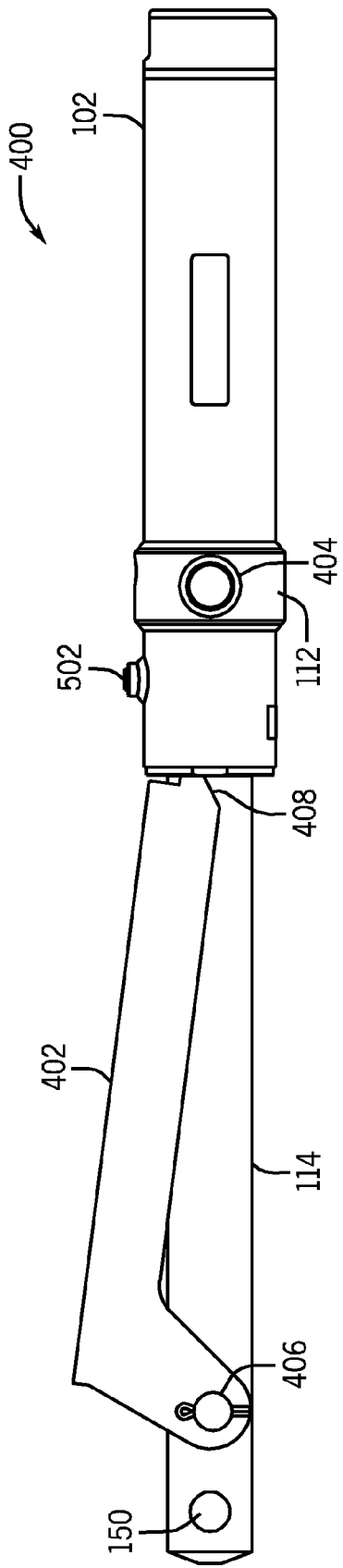
FIG. 5 is an illustration of the embodiment of FIG. 4 with the locking mechanism engaged, with the actuator in the maintenance position.

Referring to FIG. 5, the embodiment of FIG. 4 is shown in the locked position. Once piston rod 114 is extended to near its maximum length, the locking bar 402 pivots about pin 406 with the end opposite the pin 406 contacting the portion of the actuator where the piston rod 114 and cylinder housing 102 join. Once the pressure provided to the actuator 400 is released the piston rod 114 retracts slightly and the locking bar 402 engages the lip of cylinder housing 102. The notch 408 keeps the locking bar 402 in place. The locking bar 402 is configured to withstand the entire force of the cab acting to compress actuator 400 when the actuator is unpressurized.

To unlock and lower the cab, the actuator 300 is pressurized to extend piston rod 114 enough to clear the notch 408 and pivot the locking bar 402 clear of the lip of cylinder housing 102.

Exemplary embodiments are described herein. While specific values chosen for the embodiment are recited, it is to be understood that, within the scope of the invention, the values of all of parameters may vary over wide ranges to suit different applications.

The embodiments described herein depict Applicant's lost motion piston assembly in a single acting hydraulic actuator. In other embodiments, Applicant's lost motion piston assembly may also be used in double acting actuators. Single acting actuators exert force in a single direction by pumping pressurized fluid into a cavity. Referring back to FIG. 1, this cavity is formed by 124 and 128 (which are connected by channels 126). As pressurized fluid is pumped into this cavity, the piston rod 114 is forced to extend out from the body 102. While the use of pressurized fluid can force the piston rod 114 to extend, an external force is necessary to force the piston rod 114 to retract. The cavity is vented to a lower pressure allowing the external force to force the fluid from the cavity.

In contrast, a double acting actuator has two cavities (ex: Cavity 1 and Cavity 2) separated by a piston. Pumping fluid under pressure to Cavity 1 while venting Cavity 2 to a lower pressure forces the piston in one direction. Likewise, pumping fluid under pressure to Cavity 2 while venting Cavity 1 to a lower pressure forces the piston in the opposite direction. The single acting actuator with lost motion capability depicted in FIGS. 1-3 may be modified into a double acting actuator with lost motion capability by disposing a piston ring around piston rod 114 to create two isolated chambers. Pressure port 160 (see FIG. 1) would be used to pressurize/vent one chamber and another pressure port would be added to pressurize/vent the other chamber. A channel connecting the two chambers is also added. The channel would include a valve. The valve is closed (i.e., the two chambers are isolated) when the double acting actuator piston is being extended or retracted under the influence of pressurized fluid. The valve is open (i.e., the two chambers are connected to form a single chamber) when the double acting actuator is in lost motion mode. While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s).

What is claimed is:

1. An actuator for tilting a cab of a vehicle between a driving position and a maintenance position, the actuator comprising:
    a cylinder housing having an internal cavity, a rod end and a bore end;
    a piston rod disposed partially within the internal cavity, wherein:
        the piston rod is configured to move axially in a reciprocating manner relative to the cylinder housing;
        the piston rod has an exposed portion extending from the rod end of the cylinder housing which varies in length as the piston rod extends or retracts relative to the cylinder housing; and
        the piston rod has an enclosed portion within the cylinder housing which varies in length as the piston rod extends or retracts relative to the cylinder housing;
    a pressure cavity formed between an inner surface of the cylinder housing and the piston rod, wherein:
        the piston rod is forced to extend from the cylinder housing when hydraulic fluid is supplied to the pressure cavity; and
        the piston rod is allowed to retract under an external force exerted axially on the exposed portion of the piston rod when the hydraulic fluid is allowed to flow from the pressure cavity;
    a lost motion bore formed in the enclosed portion of the piston rod;
    a lost motion piston disposed within the lost motion bore, wherein:
        the lost motion piston divides the lost motion bore into an isolated gas cavity and a fluid cavity;
        the fluid cavity is in fluid communication with the pressure cavity; and
        a gas is disposed in the isolated gas cavity;
    a pressure port disposed on the cylinder housing, wherein:
        the pressure port is in fluid communication with the pressure cavity; and
        the pressure port is configured to be connected alternately to a source of hydraulic fluid under a higher pressure or a receptacle of hydraulic fluid under a lower pressure.

2. An actuator for tilting the cab of a vehicle between a driving position and a maintenance position of claim 1, further comprising a connector on the lost motion piston, wherein the connector is configured to accept a source of gas to adjust the amount of gas in the isolated gas cavity.

3. An actuator for tilting a cab of a vehicle between a driving position and a maintenance position of claim 2, further comprising a retaining ring disposed in the lost motion bore to retain the lost motion piston within the lost motion bore, wherein:
    the pressure of the gas within the gas cavity is approximately 200 psi when the lost motion piston is bottomed out in the lost motion cavity; and
    the pressure of the gas within the gas cavity is less than atmospheric pressure when the lost motion piston is in contact with the retaining ring.

4. A hydraulic tilting device for tilting a cab of a vehicle between a driving position and a tilted position, which cab in the driving position is resiliently supported by a suspension on a chassis of the vehicle, comprising:
- an actuator having:
    - a cylinder housing having a cylinder space; and
    - a piston rod, wherein:
        - a first portion of the piston rod is disposed within the cylinder space; and
        - a second portion of the piston rod extends out from the cylinder space;
    - wherein:
        - an isolated gas pressure cavity is provided in the cylinder space; and
        - the isolated gas pressure cavity contracts when the actuator is extended under pressure into the cylinder space and expands when the actuator is retracted by relieving pressure in the cylinder space so as to provide for oscillating extensions and retractions of the piston rod relative to the cylinder housing in the driving position so as not to interfere with the operation of the suspension as the cab bounces up and down relative to the chassis when driving the vehicle.

5. A hydraulic tilting device for tilting a cab of a vehicle between a driving position and a tilted position of claim 4, further comprising:
- a lost motion cavity formed within the first portion of the piston rod; and
- a lost motion piston disposed within the lost motion cavity, wherein:
    - the lost motion piston divides the lost motion cavity into the isolated gas pressure cavity and a fluid cavity;
    - the fluid cavity is in fluid communication with a hydraulic pressure cavity; and
    - a gas disposed in the isolated gas pressure cavity.

6. A hydraulic tilting device for tilting a cab of a vehicle between a driving position and a tilted position of claim 5, further comprising a connector on the lost motion piston, wherein:
- the connector is in gas communication with the isolated gas pressure cavity; and
- the connector is configured to accept a source of gas to adjust the amount of gas in the isolated gas pressure cavity.

7. A hydraulic tilting device for tilting a cab of a vehicle between a driving position and a tilted position of claim 5, further comprising a retaining ring disposed in the lost motion cavity to retain the lost motion piston within the lost motion cavity.

8. A hydraulic tilting device of claim 7, wherein:
- the pressure of the gas within the isolated gas pressure cavity is above atmospheric pressure when the lost motion piston is bottomed out in the lost motion cavity; and
- the pressure of the gas within the isolated gas pressure cavity is less than atmospheric pressure when the lost motion piston is in contact with the retaining ring.

9. A hydraulic tilting device for tilting a cab of a vehicle between a driving position and a tilted position of claim 4, further comprising one pressure connector disposed on the cylinder housing, wherein:
- the pressure connector is in fluid communication with a hydraulic pressure cavity; and
- the pressure connector is configured to accept a source of hydraulic fluid.

10. A hydraulic tilting device for tilting a cab of a vehicle between a driving position and a tilted position of claim 4, further comprising:
- a locking bar, wherein:
    - the locking bar is attached to the piston rod at a proximal end of the locking bar;
    - a distal end of the locking bar extends toward the first portion of the piston rod;
    - the locking bar is configured to pivot about the piston rod; and
    - when the piston rod is substantially extended from the cylinder housing, the locking bar is configured to lock the piston rod in the extended position by bracing against an edge of the cylinder housing adjacent to the second portion of the piston rod.

11. A lost motion piston assembly for an actuator for tilting a cab of a vehicle between a driving position and a tilted position, which cab in the driving position is resiliently supported on a chassis of the vehicle, comprising:
- a lost motion cavity formed within a piston; and
- a lost motion piston disposed within the lost motion cavity, wherein:
    - the lost motion piston forms a sealed gas cavity; and
    - the sealed gas cavity contracts when the actuator is extended under pressure into a cylinder space and expands under pressure when the actuator is retracted by relieving pressure in the cylinder space.

12. A lost motion piston assembly for an actuator for tilting a cab of a vehicle between a driving position and a tilted position of claim 11, wherein the actuator is single acting.

* * * * *